(12) United States Patent
Nakahira et al.

(10) Patent No.: US 12,074,654 B2
(45) Date of Patent: *Aug. 27, 2024

(54) BASE STATION OPERATION TEST METHOD, WIRELESS COMMUNICATION SYSTEM, AND BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 418 days.

This patent is subject to a terminal disclaimer.

(21) Appl. No.: 17/603,956

(22) PCT Filed: Apr. 20, 2020

(86) PCT No.: PCT/JP2020/017007
§ 371 (c)(1),
(2) Date: Oct. 15, 2021

(87) PCT Pub. No.: WO2020/218230
PCT Pub. Date: Oct. 29, 2020

(65) Prior Publication Data
US 2022/0200710 A1    Jun. 23, 2022

(30) Foreign Application Priority Data
Apr. 23, 2019 (JP) ................. 2019-081830

(51) Int. Cl.
*H04B 17/29* (2015.01)
*H04B 17/17* (2015.01)
(Continued)

(52) U.S. Cl.
CPC ............. *H04B 17/29* (2015.01); *H04B 17/17* (2015.01); *H04W 24/06* (2013.01); *H04W 76/18* (2018.02)

(58) Field of Classification Search
CPC ....... H04B 17/29; H04B 17/17; H04W 76/18; H04W 24/00
(Continued)

(56) References Cited

U.S. PATENT DOCUMENTS

2011/0312281 A1* 12/2011 Xiao .................... H04W 24/10
                                                      455/67.11
2012/0100812 A1*  4/2012 Kuo ..................... H04W 24/06
                                                      455/67.11
(Continued)

OTHER PUBLICATIONS

I-O Data Device, Inc., Wireless LAN environment survey service, literature, Feb. 26, 2019 (Reading Day), https://www.iodata.jp/support/service/iss/sitesurvey/.

*Primary Examiner* — Obaidul Huq
(74) *Attorney, Agent, or Firm* — Harness, Dickey & Pierce, P.L.C.

(57) ABSTRACT

A method includes collecting, as environment information, a radio environment represented by a signal received at a plurality of radio communication units from another base station, each of the plurality of radio communication units being switchable between a normal mode in which the radio communication unit performs radio communication as a base station and a subordinate mode in which the radio communication unit performs radio communication as a virtual terminal station, calculating test conduct information for each base station based on base station performance
(Continued)

information representing a performance of each base station and the environment information, and conducting an operation test of each base station by, based on the test conduct information, setting any of the radio communication units to the normal mode, switching the radio communication units of the other base station to the subordinate mode, and performing radio communication with each other.

8 Claims, 9 Drawing Sheets

(51) Int. Cl.
*H04W 24/06* (2009.01)
*H04W 76/18* (2018.01)

(58) Field of Classification Search
USPC .......................................... 370/310, 328, 329
See application file for complete search history.

(56) References Cited

U.S. PATENT DOCUMENTS

| 2012/0142392 A1* | 6/2012 | Patel | H04W 52/247 |
|---|---|---|---|
| | | | 455/522 |
| 2016/0037400 A1* | 2/2016 | Kai | H04W 36/08 |
| | | | 370/331 |

* cited by examiner

| BASE STATION IDENTIFIER | BSSID OF OWN STATION | BEACON RECEPTION BSSID | BEACON RECEPTION POWER | BEACON RECEPTION CHANNEL |
|---|---|---|---|---|
| 01 | ab:cd:ef:ab:cd:ef | aa:aa:aa:aa:aa:aa | -70 dBm | 36 |
| | | bb:bb:bb:bb:bb:bb | -65 dBm | 48 |
| | | cc:cc:cc:cc:cc:cc | -80 dBm | 1 |
| | | ... | ... | ... |
| | aa:aa:aa:aa:aa:aa | ab:cd:ef:ab:cd:ef | -68 dBm | 100 |
| 02 | | ... | ... | ... |
| | | ... | ... | ... |
| ... | ... | ... | ... | ... |

| TEST NUMBER | BASE STATION IDENTIFIER | RADIO COMMUNICATION UNIT NUMBER | OPERATION MODE | CONNECTION DESTINATION | TEST DETAILS |
|---|---|---|---|---|---|
| 1 | 01 | 21-1 | BASE STATION | - | · OPERATION AS BASE STATION MODE |
| | 01 | 21-2 | TERMINAL STATION | aa:aa:aa:aa:aa:aa | · RADIO CONNECTION TO CONNECTION DESTINATION<br>· DOWNLOAD PREDETERMINED FILE THREE TIMES<br>· RADIO DISCONNECTION FROM CONNECTION DESTINATION |
| | 02 | 21-1 | BASE STATION | - | · OPERATION AS BASE STATION MODE |
| | 02 | 21-2 | TERMINAL STATION | bb:bb:bb:bb:bb:bb | · RADIO CONNECTION TO CONNECTION DESTINATION<br>· DOWNLOAD PREDETERMINED FILE THREE TIMES<br>· RADIO DISCONNECTION FROM CONNECTION DESTINATION |
| | 03 | 21-1 | BASE STATION | - | · OPERATION AS BASE STATION MODE |
| | 03 | 21-2 | TERMINAL STATION | cc:cc:cc:cc:cc:cc | · RADIO CONNECTION TO CONNECTION DESTINATION<br>· DOWNLOAD PREDETERMINED FILE THREE TIMES<br>· RADIO DISCONNECTION FROM CONNECTION DESTINATION |
| ... | ... | ... | ... | ... | ... |

Fig. 6

| BASE STATION IDENTIFIER | TEST NUMBER | TEST DATE AND TIME | RADIO COMMUNICATION UNIT NUMBER | TEST RESULT |
|---|---|---|---|---|
| 01 | 1 | 2018/9/7 14:50 | 21-1 | · OPERATION AS BASE STATION MODE: OK<br>· TRAFFIC: DOWNLINK 55 Mbps |
| | | | 21-2 | · OPERATION AS TERMINAL STATION MODE: OK<br>· RADIO CONNECTION: OK<br>· FILE DOWNLOAD: OK (40 Mbps)<br>· RADIO DISCONNECTION: OK |
| | ⋮ | ⋮ | ⋮ | ⋮ |

BASE STATION OPERATION TEST METHOD, WIRELESS COMMUNICATION SYSTEM, AND BASE STATION

CROSS-REFERENCE TO RELATED APPLICATIONS

This application is a 371 U.S. National Phase of International Application No. PCT/JP2020/017007 filed on Apr. 20, 2020, which claims priority to Japanese Application No. 2019-081830 filed on Apr. 23, 2019. The entire disclosures of the above applications are incorporated herein by reference.

TECHNICAL FIELD

The present invention relates to an operation test method of a base station, a radio communication system and a base station.

BACKGROUND ART

As a high-speed radio access system using radio waves of a license-free band, there is the IEEE 802.11 wireless LAN standard, which specifies various standards such as 11a, 11b, 11g, 11n and 11ac with different radio frequency bands, radio transmission techniques, and radio transmission rates.

The 11b standard is a radio transmission rate of up to 11 Mbps using the 2.4 GHz band. The 11a standard is a radio transmission rate of up to 54 Mbps using the 5 GHz band. The 11 g standard is a radio transmission rate of up to 54 Mbps using the 2.4 GHz band. The 11n standard is a radio transmission rate of up to 600 Mbps utilizing 2.4 and 5 GHz bands. The 11ac standard is a radio transmission rate of up to 6900 Mbps using the 5 GHz band. These various IEEE 802.11 wireless LAN standards are backward compatible and can be used in a mixed environment.

In addition, in public areas such as train stations, airports, shopping malls, and stadiums, wireless LAN connection services are provided in order to attract customers and improve user satisfaction. In such environments, a plurality of wireless LAN base stations may be installed in a centralized location in order to accommodate a large number of users. In addition, the system performance of the connection service may be evaluated after the installation of the wireless LAN system (see, for example, NPTL 1).

Citation List

Non Patent Literature

NPTL 1: Wireless LAN Environment Survey Service, [online], I-O DATA DEVICE, Inc [searched on Mar. 3, 2019], the Internet <URL: https://www.iodata.jp/support/service/iss/sitesurvey/>

SUMMARY OF THE INVENTION

Technical Problem

In order to evaluate the system performance of a wireless LAN connection service in an environment where a plurality of wireless LAN base stations are installed, it is necessary to connect a test terminal station to each base station and perform simultaneous radio communication at the same time.

Although it is possible to test base stations one by one, base stations installed at a close distance from each other may cause radio interference with each other depending on the radio channel used, and this is not suitable for evaluating the entire area. When radio communication is performed for a plurality of base stations at the same time, it requires a lot of manpower and operation for the test, as well as the tasks to compile the test results after the test is performed using a plurality of test patterns.

An object of the present invention is to provide an operation test method of a plurality of base stations, a radio communication system, and the plurality of base stations that enables an operation test of the plurality of base stations without the need for a worker to connect terminal stations on site.

Means for Solving the Problem

An operation test method according to an aspect of the present invention is an operation test method of a plurality of base stations to which a terminal station is connectable, the method comprising collecting, as environment information, a radio environment represented by a signal received at a plurality of radio communication units from another base station of the plurality of base stations, each of the plurality of radio communication units being switchable between a normal mode in which the radio communication unit performs radio communication as a base station and a subordinate mode in which the radio communication unit performs radio communication as a virtual terminal station, calculating test conduct information for each of the plurality of base stations based on base station performance information representing a performance of each of the plurality of base stations and the environment information, and conducting an operation test of each of the plurality of base stations by, based on the test conduct information, setting any of the plurality of radio communication units to the normal mode, switching the plurality of radio communication units of the other base station to the subordinate mode, and performing radio communication with each other.

In the operation test method of the plurality of base stations according to an aspect of the present invention, each of the plurality of radio communication units is switchable between the normal mode and the subordinate mode compatible with a plurality of communication standards.

In the operation test method of the plurality of base stations according to an aspect of the present invention, the test conduct information is information representing conduct of a test in which a traffic simultaneously flows to a combination of the plurality of base stations in an interference relationship in which transmission signals are mutually detected at the same frequency represented by the environment information.

A radio communication system according to an aspect of the present invention includes a plurality of base stations configured to perform radio communication with a terminal station and a control station configured to control each of the plurality of base stations, wherein each of the plurality of base stations includes a plurality of radio communication units, each of the plurality of radio communication units being switchable between a normal mode in which the radio communication unit performs radio communication as a base station and a subordinate mode in which the radio communication unit performs radio communication as a virtual terminal station, an environment information collection unit configured to collect, as environment information, a radio environment represented by a signal received at the plurality of radio communication units from another base station of the plurality of base stations, and a test conduct unit configured to conduct an operation test of the base station by, based on test conduct information, setting any of the plurality of radio communication units to the normal mode and performing radio communication with the plurality of radio communication units of the other base station switched to the subordinate mode, and the control station includes a calculation unit configured to calculate the test conduct information for each of the plurality of base stations based on base station performance information representing a performance of each of the plurality of base stations and the environment information, and a communication unit configured to transmit the test conduct information calculated by the calculation unit to each of the plurality of base stations.

In the radio communication system according to an aspect of the present invention, each of the plurality of radio communication units is switchable between the normal mode and the subordinate mode compatible with a plurality of communication standards.

In the radio communication system according to an aspect of the present invention, the test conduct information is information representing conduct of a test in which a traffic simultaneously flows to a combination of the plurality of base stations in an interference relationship in which transmission signals are mutually detected at the same frequency represented by the environment information.

A base station according to an aspect of the present invention is a base station to which a terminal station is connectable, the base station including a plurality of radio communication units, each of the plurality of radio communication units being switchable between a normal mode in which the radio communication unit performs radio communication as a base station and a subordinate mode in which the radio communication unit performs radio communication as a virtual terminal station, an environment information collection unit configured to collect, as environment information, a radio environment represented by a signal that is received at the plurality of radio communication units from another base station, and a test conduct unit configured to conduct an operation test of the base station by, based on test conduct information calculated using base station performance information representing a performance of the base station and the environment information, setting any of the plurality of radio communication units to the normal mode and performing radio communication with a plurality of radio communication units of the other base station switched to the subordinate mode.

In the base station according to an aspect of the present invention, each of the plurality of radio communication units is switchable between the normal mode and the subordinate mode compatible with a plurality of communication standards.

Effects of the Invention

According to the present invention, it is possible to conduct an operation test of a plurality of base stations without the need for a worker to connect terminal stations on site.

DESCRIPTION OF EMBODIMENTS

Figure 1:
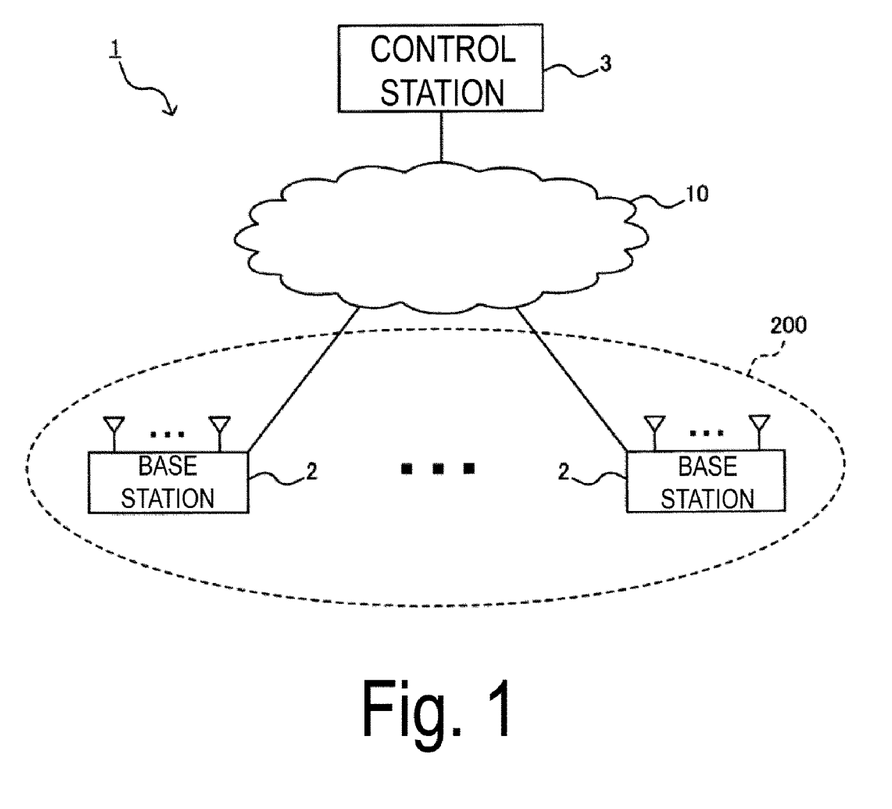
FIG. 1 illustrates an exemplary configuration of a radio communication system according to an embodiment.

An embodiment of a radio communication system is described below with reference to the drawings. FIG. 1 illustrates an exemplary configuration of a radio communication system 1 according to an embodiment. As illustrated in FIG. 1, in the radio communication system 1, for example, a plurality of base stations 2 are connected to a control station 3 through a network 10. The radio communication system 1 includes an area 200 where a terminal station (not illustrated) can be wirelessly connected to any of a plurality of base stations 2. In addition, each base station 2 accommodates a plurality of terminal stations of various communication standards or communication schemes in the area 200.

Figure 2:
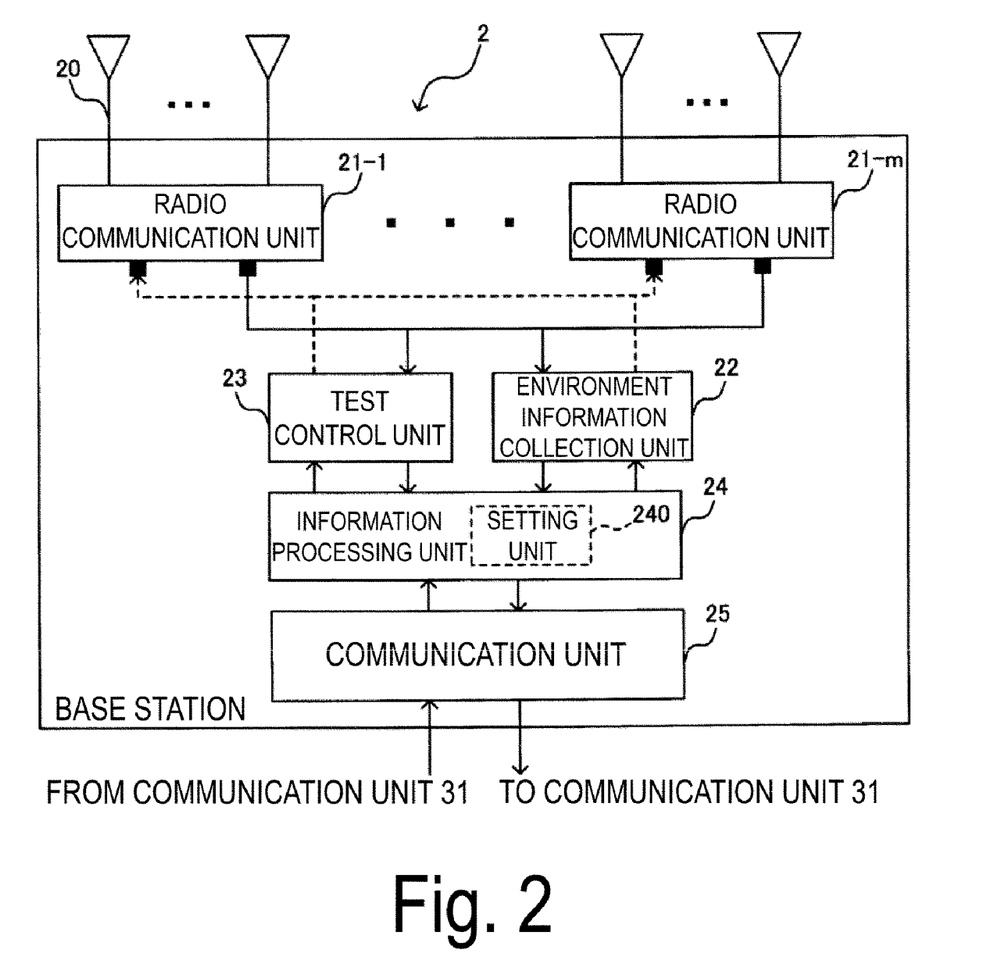
FIG. 2 illustrates an exemplary configuration of a base station according to the embodiment.

FIG. 2 illustrates an exemplary configuration of the base station 2 according to the embodiment. As illustrated in FIG. 2, the base station 2 includes a plurality of antennas 20, m radio communication units 21-1 to 21-m, an environment information collection unit 22, a test control unit 23, an information processing unit 24 including a setting unit 240 and a communication unit 25, for example. It is to be noted that when the plurality of configurations such as the radio communication units 21-1 to 21-m is not individually specified, they are simply abbreviated as a radio communication unit 21 or the like. In addition, other function blocks that are provided in typical base stations are not illustrated.

A plurality of the antennas 20 is connected to each of the radio communication units 21-1 to 21-m. The antenna 20 transmits radio frames input from the radio communication units 21-1 to 21-m, and outputs received radio frames to the radio communication units 21-1 to 21-m.

The radio communication units 21-1 to 21-m can each independently perform radio communication of wireless LAN and the like with one or more terminal stations through the plurality of the antennas 20, for example. In addition, each of the radio communication units 21-1 to 21-m is switchable between a normal mode (base station mode) in which the base station 2 performs radio communication for functioning as a normal base station, and a subordinate mode (terminal station mode) in which the base station 2 performs radio communication as a virtual terminal station.

Further, for example, each of the radio communication units 21-1 to 21-m is changeably compatible with various communication standards or communication schemes, and performs radio communication such as transmission and reception of test data for an operation test in accordance with a set communication standard through the antennas 20. That is, the radio communication units 21-1 to 21-m can function as base stations or virtual terminal stations of different communication standards.

The environment information collection unit 22 collects, as environment information, a radio environment around the own station, such as the power, the reception channel and the like of a beacon signal received by the radio communication units 21-1 to 21-*m* from another base station 2, and outputs the information to the information processing unit 24.

Figure 3:
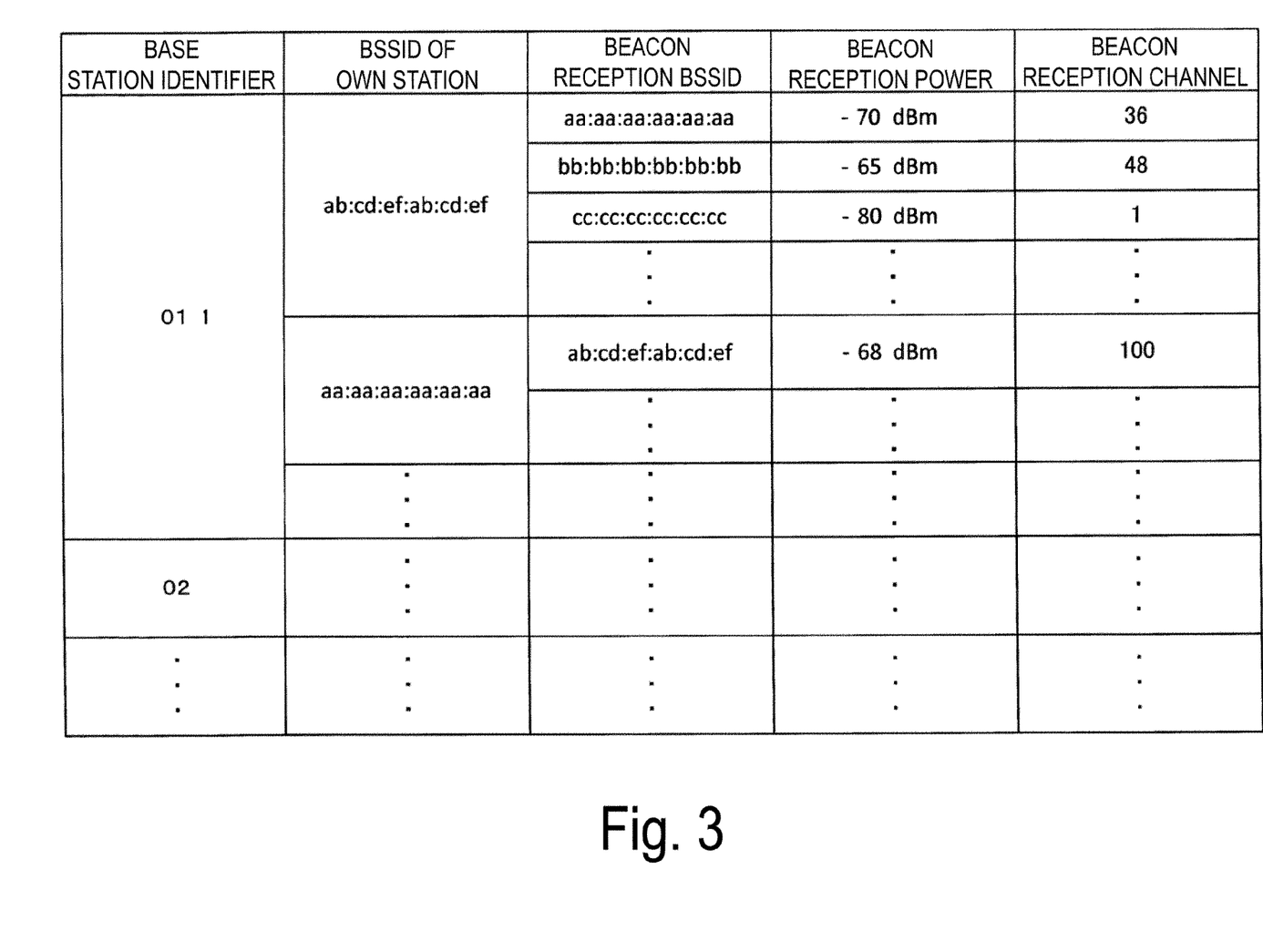
FIG. 3 illustrates exemplary environment information collected by an environment information collection unit.

FIG. 3 illustrates exemplary environment information collected by the environment information collection unit 22. As illustrated in FIG. 3, the environment information is information that can be acquired at each base station 2 from beacon signals received from other base stations 2 in a surrounding region. The environment information includes a base station identifier, a basic serivce set identifier (BSSID) of the own station, a beacon reception BSSID, a beacon reception power, and a beacon reception channel.

The test control unit 23 (FIG. 2) bidirectionally inputs and outputs signals to and from each of the radio communication units 21-1 to 21-*m* and the information processing unit 24. For example, the test control unit 23 inputs and outputs test data used when the base station 2 performs an operation test to and from the radio communication units 21-1 to 21-*m* and controls the operation test of the base station 2.

Figure 4:
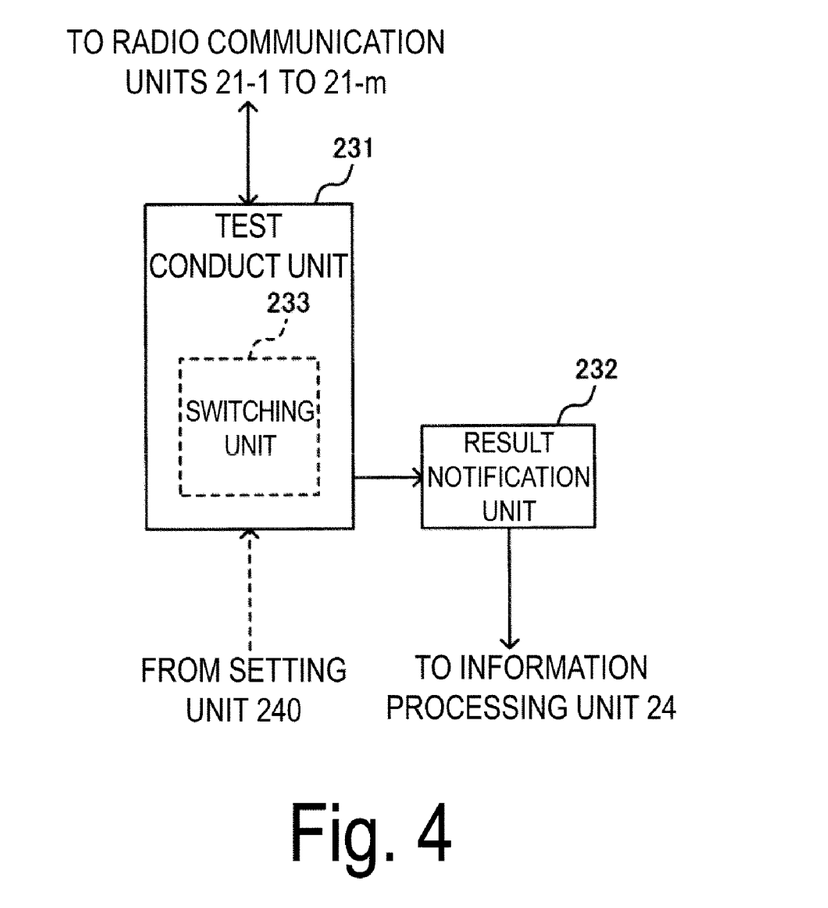
FIG. 4 illustrates details of a function of a test control unit.

FIG. 4 illustrates details of a function of the test control unit 23. As illustrated in FIG. 4, the test control unit 23 includes a test conduct unit 231 and a result notification unit 232.

The test conduct unit 231 includes a switching unit 233 configured to switch the radio communication units 21-1 to 21-*m* to a base station mode or a terminal station mode. The test conduct unit 231 conducts a test by performing a setting based on test conduct information set by the setting unit 240 of the information processing unit 24.

Here, the test conduct information is information (described later with reference to FIG. 6) including a condition for the plurality of base stations 2 to cooperate with each other to conduct a test, and is delivered to each base station 2 from the control station 3. For example, the test conduct information is information representing conduct of a test in which a traffic simultaneously flows to a combination of the base stations 2 in an interference relationship in which transmission signals are mutually detected at the same frequency represented by the environment information.

For example, the test conduct unit 231 conducts the operation test of the base station 2 by performing a setting based on test conduct information on the radio communication units 21-1 to 21-*m* so as to perform radio communication between the radio communication unit 21 operating in the normal mode and the radio communication unit 21 of another base station 2 switched to the subordinate mode.

In addition, after the switching unit 233 switches a specific radio communication unit 21 of the base station 2 to the subordinate mode, the test conduct unit 231 causes the specific radio communication unit 21 to perform radio communication with the radio communication unit 21 of another base station 2 operating in the normal mode, and thus the test conduct unit 231 conducts the operation test of the other base station 2.

In this manner, the test conduct unit 231 sets at least any of the radio communication units 21 to the normal mode on the basis of the test conduct information and causes the radio communication unit in the normal mode to perform radio communication with the radio communication unit 21 of the other base station 2 switched to the subordinate mode to thereby conduct the operation test of the base station.

The result notification unit 232 acquires the result of the operation test conducted by the test conduct unit 231, and notifies the result to the information processing unit 24.

The information processing unit 24 (FIG. 2) includes a CPU and a memory (not illustrated) and performs a predetermined information process to bidirectionally input and output signals to and from each of the environment information collection unit 22, the test control unit 23 and the communication unit 25. For example, the information processing unit 24 acquires the environment information collected by the environment information collection unit 22, and outputs the information to the communication unit 25.

In addition, in the information processing unit 24, the setting unit 240 performs, on the test control unit 23, a setting based on the test conduct information input from the communication unit 25. In addition, the information processing unit 24 compiles, as test result information, the results of the operation test input from the test control unit 23, and outputs the information to the communication unit 25 together with the base station performance information. The base station performance information is information representing the performance of the radio communication of the base station 2. The base station performance information includes information such as the number (m) of the radio communication units 21, the number of the antennas 20, and the compatible communication standard.

The communication unit 25 transmits (notifies), to the control station 3, the base station performance information, the environment information and the test result information input from the information processing unit 24 by, for example, a wired communication through the network 10 (FIG. 1). In addition, the communication unit 25 outputs, to the information processing unit 24, the test conduct information transmitted from the control station 3 through the network 10.

Figure 5:
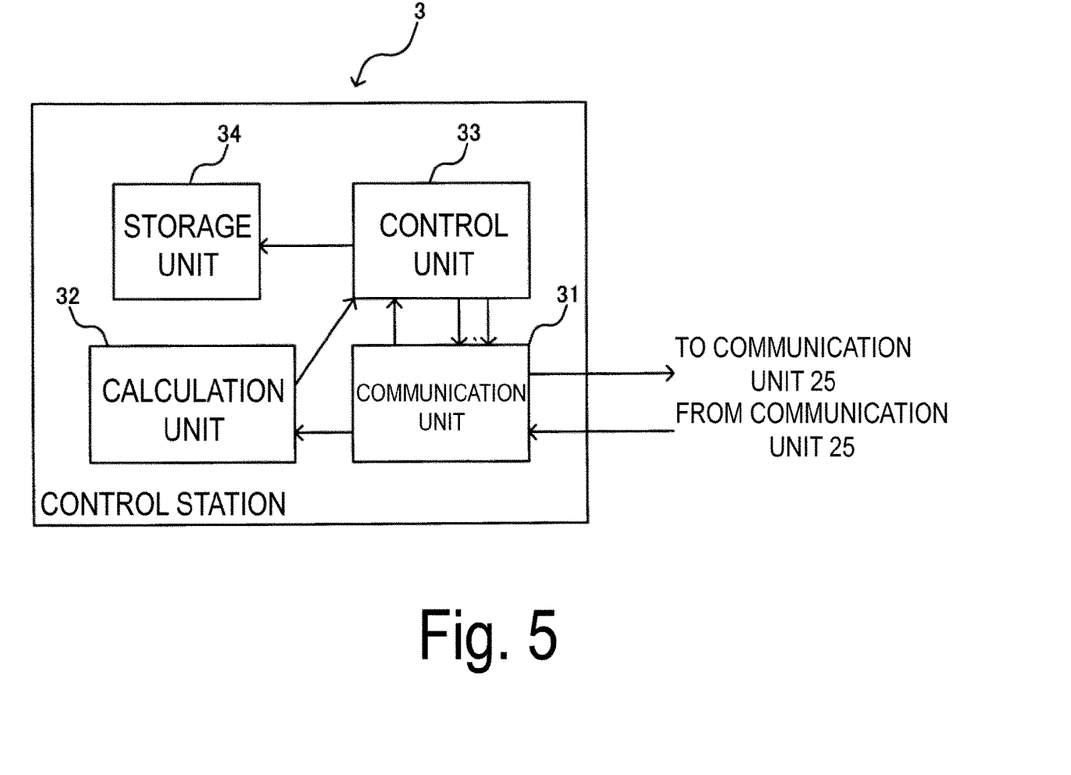
FIG. 5 illustrates an exemplary configuration of a control station.

FIG. 5 illustrates an exemplary configuration of the control station 3. As illustrated in FIG. 5, the control station 3 includes a communication unit 31, a calculation unit 32, a control unit 33 and a storage unit 34. It is to be noted that other function blocks that are provided in typical control stations are not illustrated.

The communication unit 31 receives the base station performance information and the environment information from each base station 2 by, for example, a wired communication through the network 10, and outputs the information to the calculation unit 32. In addition, the communication unit 31 receives the test result information from each base station 2, and stores the information in the storage unit 34 through the control unit 33. In addition, the communication unit 31 transmits (delivers) each information input from the control unit 33 to each base station 2 through the network 10.

The calculation unit 32 calculates test conduct information for each base station 2 on the basis of the base station performance information and the environment information input from the communication unit 31, and outputs the calculated test conduct information to the control unit 33.

Figure 6:
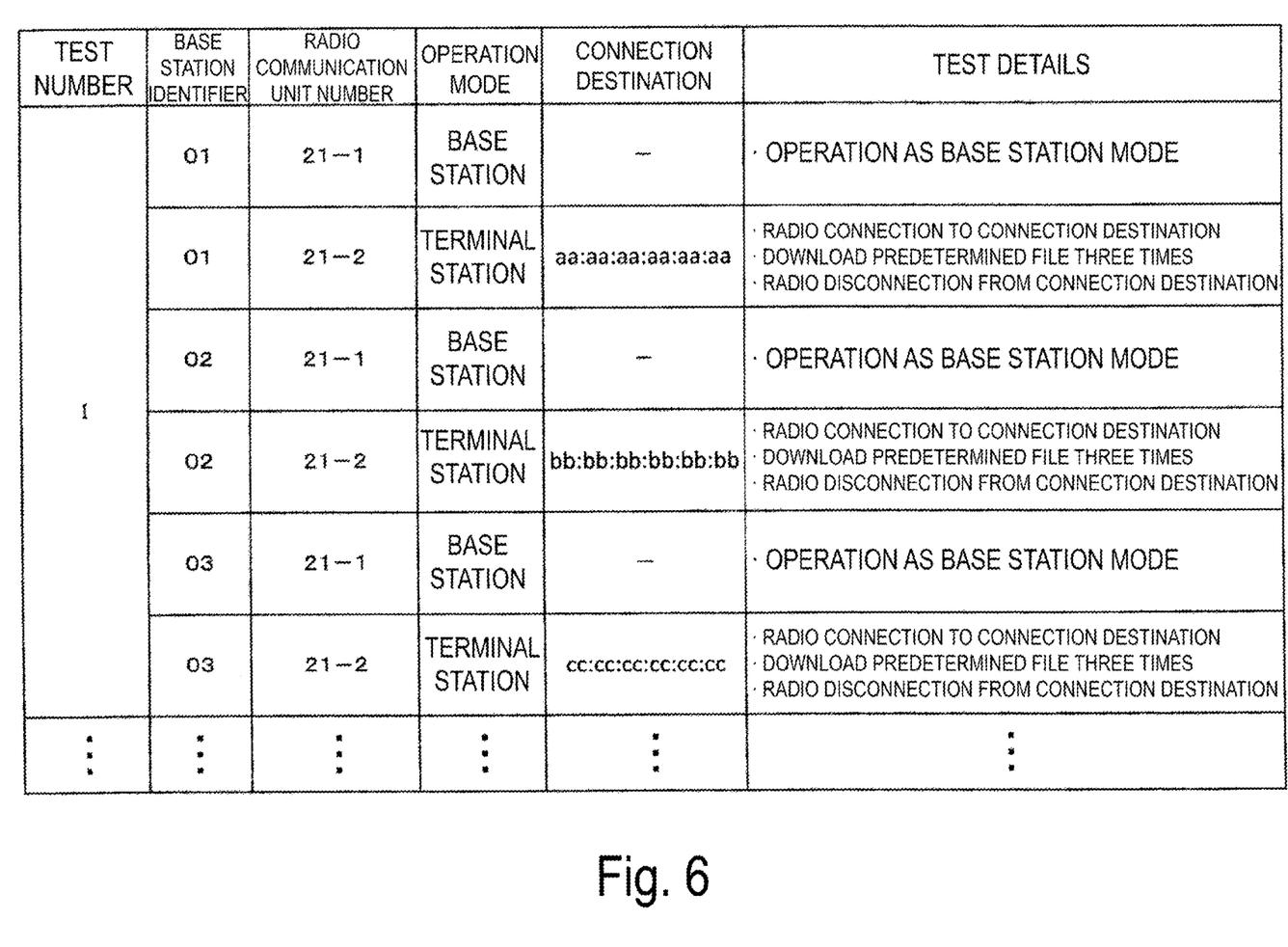
FIG. 6 illustrates exemplary test conduct information calculated by a calculation unit.

FIG. 6 illustrates an exemplary test conduct information calculated by the calculation unit 32. As illustrated in FIG. 6, the test conduct information is information that specifies, by test numbers, the test condition of the case where each base station 2 identified by the base station identifier performs an operation test. For example, the test conduct information is defined for each test number, and includes the base station identifier, the radio communication unit number, the operation mode, the connection destination, and the test details.

In FIG. 6, the base station identifier includes information that identifies the base station 2 such as the media access control (MAC) address and the serial number of the base station 2 where the test is conducted. The radio communication unit number is information that specifies any of the radio communication units 21. The operation mode is information representing whether the operation of the radio communication unit 21 is the base station mode or the terminal station mode. The connection destination is information that specifies the connection destination of the radio communication unit 21 in the terminal station mode. The test details are information representing the operation of each radio communication unit 21 when the radio communication system 1 performs the operation test.

The control unit 33 (FIG. 5) controls each unit of the control station 3. For example, the control unit 33 causes the storage unit 34 to store the test result information input from the communication unit 31, and causes the communication unit 31 to transmit the test conduct information calculated by the calculation unit 32.

The storage unit 34 is a storage apparatus or the like that stores the test result information input from the communication unit 31.

Figure 7:
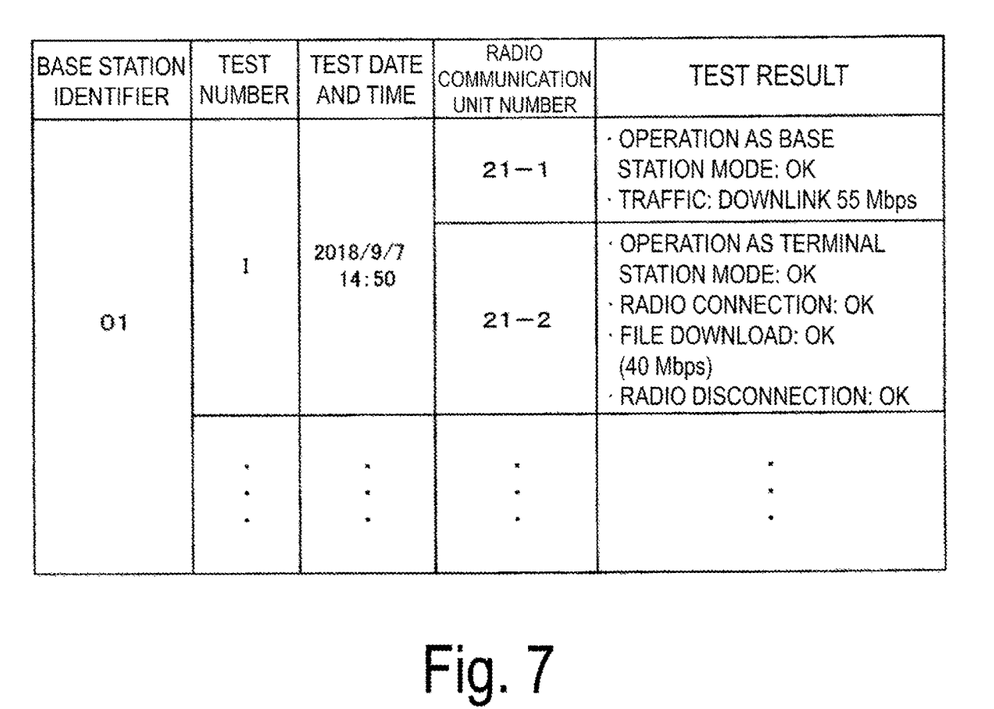
FIG. 7 illustrates exemplary test result information stored in a storage unit.

FIG. 7 illustrates exemplary test result information stored in the storage unit 34. As illustrated in FIG. 7, the test result information includes the base station identifier, the test number, the test date and time, the radio communication unit number and the test result.

Next, an exemplary operation of the radio communication system 1 is described.

Figure 8:
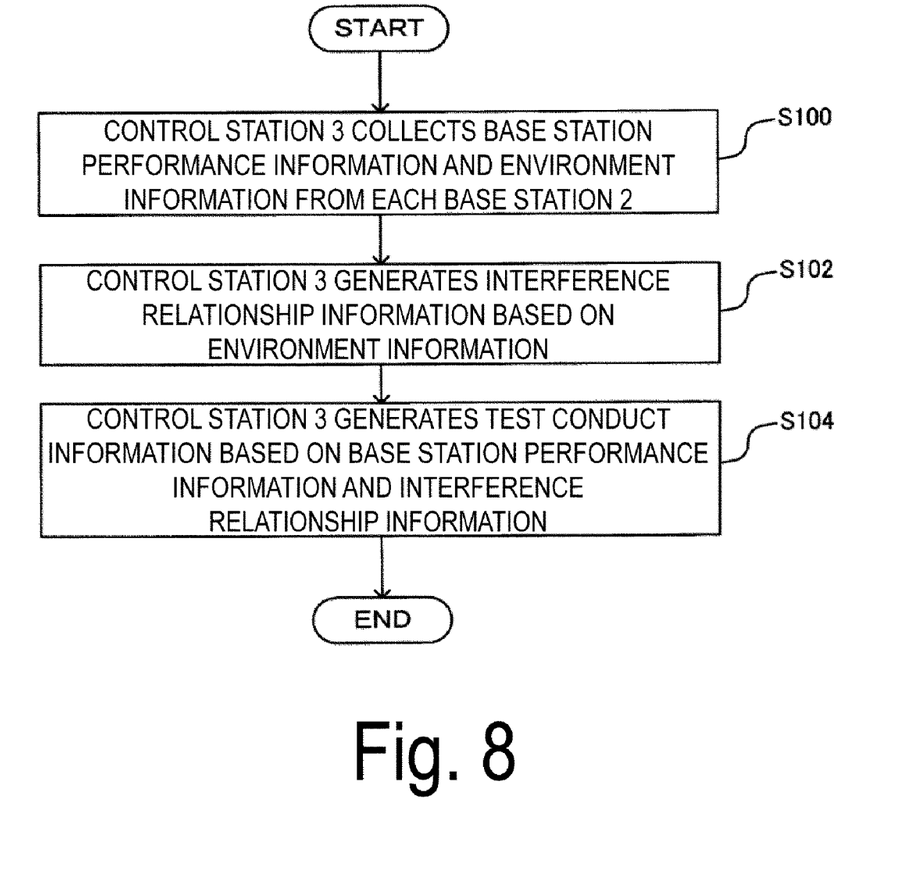
FIG. 8 is a flowchart of a process of generating the test conduct information in the radio communication system.

FIG. 8 is a flowchart of a process of generating test conduct information in the radio communication system 1. First, the control station 3 collects the base station performance information and the environment information from each base station 2 (S100).

Next, in the control station 3, the calculation unit 32 generates an interference relationship information representing an interference relationship among the plurality of base stations 2 on the basis of the environment information collected from each base station 2, for example (S102).

For example, the control station 3 generates the interference relationship information by compiling the levels of the powers of signals received at the base stations 2 from other base stations 2 in their surrounding regions on the basis of the powers of beacon signals mutually transmitted between the base stations 2.

It is to be noted that the purpose of generating the interference relationship information at the control station 3 is to find a pair of base stations 2 that are presumed to be connectable when the base stations 2 are connected to each other.

Next, the control station 3 generates test conduct information on the basis of the base station performance information and the interference relationship information (S104).

Then, for example, when it is determined on the basis of the interference relationship information that the base stations 2 with base station identifiers of 01, 02 and 03 are close to each other and are in an interference relationship in which transmission signals are mutually detected at the same frequency, the control station 3 conducts a test in which a traffic simultaneously flows to the base stations 2 with the base station identifiers of 01, 02 and 03.

At this time, the radio communication system 1 performs a setting for the radio communication units 21-1 to 21-*m* of each of the base stations 2 with the base station identifiers of 01, 02 and 03 on the basis of the number of the radio communication units 21 included in the base station performance information of the base station 2.

For example, the test control unit 23 sets the operation mode for each radio communication unit 21 of each base station 2 as in the example illustrated in FIG. 6. In addition, the test control unit 23 sets the connection destination of the radio communication unit 21 when the radio communication unit 21 operates in the terminal station mode. The test details may be set as necessary from among operation details prepared in advance. In this manner, the radio communication system 1 can perform a performance measurement in consideration of actual use situations.

Figure 9:
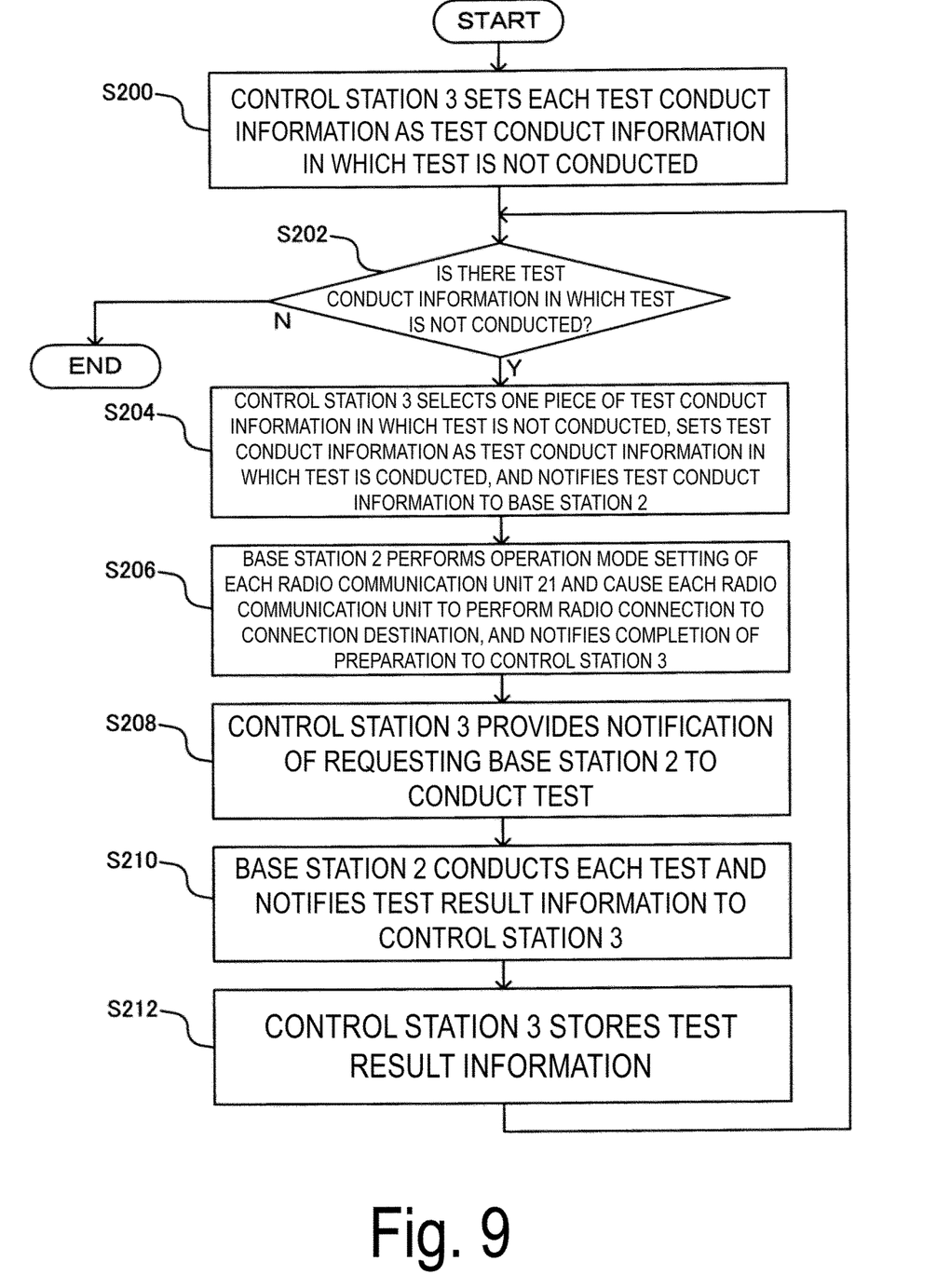
FIG. 9 is a flowchart of an example of an operation test for the base station.

FIG. 9 is a flowchart of an example of an operation test for the base station 2. First, the control station 3 sets all test conduct information as test conduct information in which the test is not conducted (S200).

Next, the control station 3 determines whether there is test conduct information in which the test is not conducted in all test conduct information (S202). When there is such test conduct information (S202: Yes), the control station 3 proceeds to the process of S204, and when there is no such test conduct information (S202: No), the process is terminated.

Next, the control station 3 selects one piece of test conduct information in which the test is not conducted, and sets the selected test conduct information as test conduct information in which the test is conducted. Then, the control station 3 notifies the test conduct information to each base station 2 that is the object of the test in the selected test conduct information (S204).

Each base station 2 performs an operation mode setting of each of the radio communication units 21-1 to 21-*m* and cause each of the radio communication units 21-1 to 21-*m* to perform a radio connection to the connection destination on the basis of the notified test conduct information, and each base station 2 notifies completion of the preparation of the test to the control station 3 (S206).

Next, the control station 3 confirms that all the notifications of the completion of the preparation of the test are received from each base station 2 to which the test conduct information has been notified, and the control station 3 provides a notification of a request to conduct the test to each base station 2 (S208).

When receiving the notification of a request to conduct the test from the control station 3, each base station 2 conducts the test on the basis of the test conduct information, and notifies the test result information to the control station 3 (S210).

Next, the control station 3 stores the test result information acquired from each base station 2 in the storage unit 34, and returns to the process of S202.

In this manner, the radio communication system 1 periodically performs the process described with reference to FIGS. 8 and 9, etc., and thus can autonomously conduct a test in which the plurality of base stations 2 cooperate with each other. In addition, the radio communication system 1 uses, as the test conduct condition, the number of terminal stations connected to the base station 2, the traffic information and the like, for example, and thus can determine whether the test can be conducted in consideration of the use situations of the users.

Thus, the radio communication system 1 can conduct an operation test with the plurality of base stations 2 cooperating with each other without the need for a worker to connect terminal stations on site, and can evaluate and confirm the performance and the operation status of the entire radio connection service rather than each base station, without the need of measurement personnel. Further, in the radio communication system 1, since the base station 2 notifies the test result to the control station 3, the operator of the radio communication system 1 can readily collect and confirm the test results of the plurality of base stations 2, which can reduce the task of confirming the test results.

In addition, when conducting the operation test, the radio communication system 1 uses some of the plurality of radio communication units 21 of the base station 2 for the operation test, and thus can conduct the operation test while maintaining the provision of the radio connection service.

It is to be noted that the base station 2 and the control station 3 in the above-described embodiment may be implemented by a general-purpose computer as well as by a dedicated apparatus. In this case, the base station 2 and the control station 3 may be implemented by recording programs for implementing the functions of the stations in a computer-readable recording medium and causing a computer system to read the program recorded in the recording medium for execution.

Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system.

Further, "computer-readable recording media" may include those that hold the program dynamically for a short period of time, such as communication lines when the program is transmitted over a network such as the Internet or communication lines such as telephone lines, or those that hold the program for a certain period of time, such as a volatile memory inside a computer system that serves as the server or client in that case.

The above-mentioned program may be used to implement some of the above-mentioned functions, and further, the above-mentioned functions may be implemented in combination with a program that is already recorded in a computer system. In addition, the above-mentioned program may be implemented using hardware such as a programmable logic device (PLD) or a field programmable gate array (FPGA).

Although the embodiment of the present invention has been described above with reference to the drawings, it is clear that the above-mentioned embodiment is merely an example of the present invention and that the present invention is not limited to the above-mentioned embodiment. Therefore, additions, omissions, substitutions, and other modifications of elements may be made insofar as they are within the technical concept and scope of the invention.

REFERENCE SIGNS LIST

1 Radio communication system
2 Base station
3 Control station
10 Network
20 Antenna
21-1 to 21-*m* Radio communication unit
22 Environment information collection unit
23 Test control unit
24 Information processing unit
25 Communication unit
31 Communication unit
32 Calculation unit
33 Control unit
34 Storage unit
231 Test conduct unit
232 Result notification unit
233 Switching unit
240 Setting unit

The invention claimed is:

1. An operation test method of a plurality of base stations to which a terminal station is connectable, the method comprising:
   collecting, as environment information, a radio environment represented by a signal received at a plurality of radio communication units from another base station of the plurality of base stations, each of the plurality of radio communication units being switchable between a normal mode in which the radio communication unit performs radio communication as a base station and a subordinate mode in which the radio communication unit performs radio communication as a virtual terminal station;
   calculating test conduct information for each of the plurality of base stations based on base station performance information representing a performance of each of the plurality of base stations and the environment information; and
   conducting an operation test of each of the plurality of base stations by, based on the test conduct information, by setting any of the plurality of radio communication units to the normal mode, switching the plurality of radio communication units of the other base station to the subordinate mode, and performing radio communication with each other.

2. The operation test method of the plurality of base stations according to claim 1, wherein each of the plurality of radio communication units is switchable between the normal mode and the subordinate mode compatible with a plurality of communication standards.

3. The operation test method of the plurality of base stations according to claim 2, wherein the test conduct information is information representing conduct of a test in which a traffic simultaneously flows to a combination of the plurality of base stations in an interference relationship in which transmission signals are mutually detected at the same frequency represented by the environment information.

4. A radio communication system comprising:
   a plurality of base stations configured to perform radio communication with a terminal station; and
   a control station configured to control each of the plurality of base stations, wherein
   each of the plurality of base stations includes:
      a plurality of radio communication units, each of the plurality of radio communication units being switchable between a normal mode in which the radio communication unit performs radio communication as a base station and a subordinate mode in which the radio communication unit performs radio communication as a virtual terminal station;
      an environment information collection unit configured to collect, as environment information, a radio environment represented by a signal received at the plurality of radio communication units from another base station of the plurality of base stations; and
      a test conduct unit configured to conduct an operation test of the base station by, based on test conduct information, by setting any of the plurality of radio communication units to the normal mode and performing radio communication with the plurality of radio communication units of the other base station switched to the subordinate mode, and
   the control station includes:
      a calculation unit configured to calculate the test conduct information for each of the plurality of base stations based on base station performance information representing a performance of each of the plurality of base stations and the environment information; and a communication unit configured to transmit the test conduct information calculated by the calculation unit to each of the plurality of base stations.

5. The radio communication system according to claim 4, wherein each of the plurality of radio communication units is switchable between the normal mode and the subordinate mode compatible with a plurality of communication standards.

6. The radio communication system according to claim 5, wherein the test conduct information is information representing conduct of a test in which a traffic simultaneously flows to a combination of the plurality of base stations in an interference relationship in which transmission signals are mutually detected at the same frequency represented by the environment information.

7. A base station to which a terminal station is connectable, the base station comprising:

a plurality of radio communication units, each of the plurality of radio communication units being switchable between a normal mode in which the radio communication unit performs radio communication as a base station and a subordinate mode in which the radio communication unit performs radio communication as a virtual terminal station;

an environment information collection unit configured to collect, as environment information, a radio environment represented by a signal that is received at the plurality of radio communication units from another base station; and a test conduct unit configured to conduct an operation test of the base station by, based on test conduct information calculated using base station performance information representing a performance of the base station and the environment information, by setting any of the plurality of radio communication units to the normal mode and performing radio communication with a plurality of radio communication units of the other base station switched to the subordinate mode.

8. The base station according to claim 7, wherein each of the plurality of radio communication units is switchable between the normal mode and the subordinate mode compatible with a plurality of communication standards.

* * * * *